United States Patent
Pison et al.

(10) Patent No.: US 11,297,485 B2
(45) Date of Patent: Apr. 5, 2022

(54) INSTALLATION OF A PRIVATE MOBILE RADIOCOMMUNICATION NETWORK, METHOD FOR FORMING SUCH AN INSTALLATION AND ASSOCIATED COMPUTER PROGRAM

(71) Applicant: Air Lynx, Les Ulis (FR)

(72) Inventors: Laurent Pison, Les Ulis (FR); Didier Raffenoux, Les Ulis (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/722,235

(22) Filed: Dec. 20, 2019

(65) Prior Publication Data
US 2020/0221283 A1 Jul. 9, 2020

(30) Foreign Application Priority Data

Dec. 21, 2018 (FR) ...................................... 1874022

(51) Int. Cl.
| | | |
|---|---|---|
| *H04W 8/08* | (2009.01) | |
| *H04W 4/10* | (2009.01) | |
| *H04W 8/20* | (2009.01) | |
| *H04W 8/26* | (2009.01) | |
| *H04W 48/18* | (2009.01) | |
| *H04W 84/08* | (2009.01) | |
| *H04W 84/16* | (2009.01) | |
| *H04W 92/02* | (2009.01) | |

(52) U.S. Cl.
CPC .............. *H04W 8/08* (2013.01); *H04W 4/10* (2013.01); *H04W 8/20* (2013.01); *H04W 8/26* (2013.01); *H04W 48/18* (2013.01); *H04W 84/08* (2013.01); *H04W 84/16* (2013.01); *H04W 92/02* (2013.01)

(58) Field of Classification Search
CPC .......... H04W 8/08; H04W 4/10; H04W 8/20; H04W 8/26; H04W 48/18; H04W 84/08; H04W 84/16; H04W 92/02
USPC ................ 370/329, 328, 338, 341, 345, 350
See application file for complete search history.

(56) References Cited

U.S. PATENT DOCUMENTS

| | | | |
|---|---|---|---|
| 8,861,494 B2 | 10/2014 | Mukhopadhyay | |
| 9,262,496 B2 * | 2/2016 | Kumarasamy | ........ G06F 16/122 |
| 9,277,528 B1 * | 3/2016 | Talley | ................... H04W 60/04 |
| 2008/0254833 A1 | 10/2008 | Keevill et al. | |

FOREIGN PATENT DOCUMENTS

EP    2 180 640 A1    4/2010

OTHER PUBLICATIONS

Search Report as issued in French Patent Application No. 1874022, dated Jul. 29, 2019.

\* cited by examiner

*Primary Examiner* — Nghi H Ly

(74) *Attorney, Agent, or Firm* — Arc IP Law, PC; Joseph J. Mayo

(57) ABSTRACT

A private mobile radio network installation includes a plurality of devices each including a local private mobile radio network infrastructure including a core network module, a subscriber server and a base station module; a management system; and a network interface; wherein the devices are connected therebetween via their network interfaces, and wherein the management systems are configured to choose one of the devices; and connect the base station module of each device to the core network module of the chosen device to form a distributed private mobile radio network infrastructure.

10 Claims, 19 Drawing Sheets

[Fig. 1]
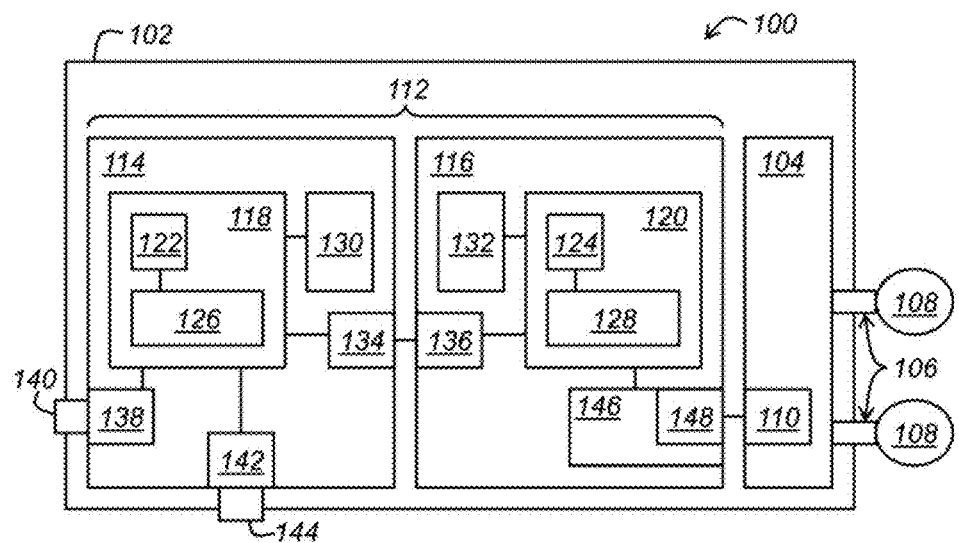
[Fig. 2]
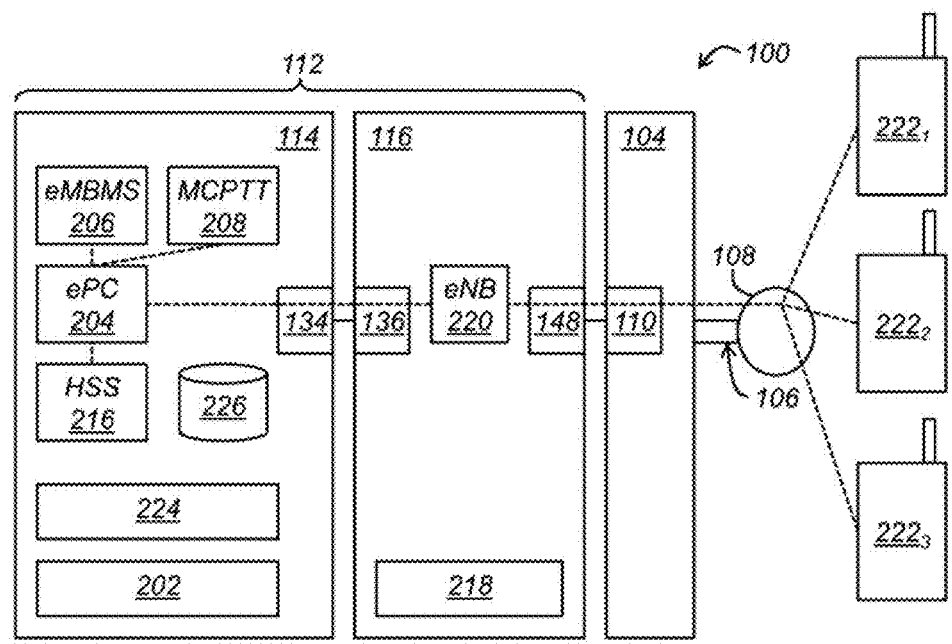

[Fig. 3]
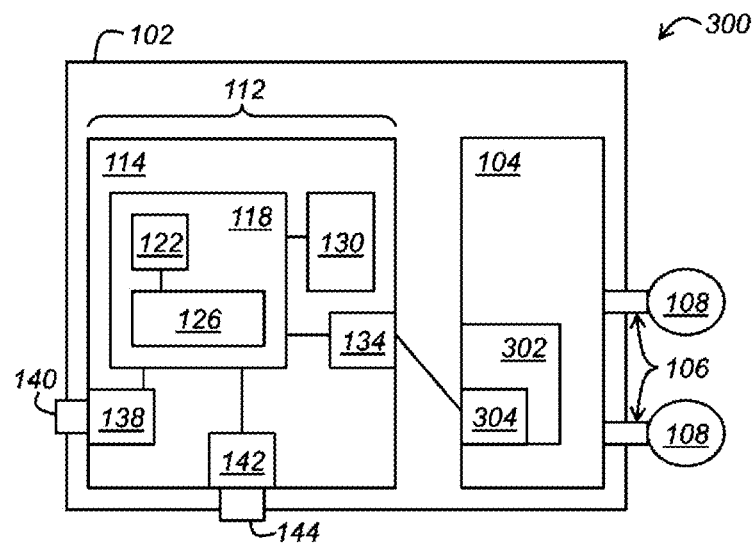
[Fig. 4]
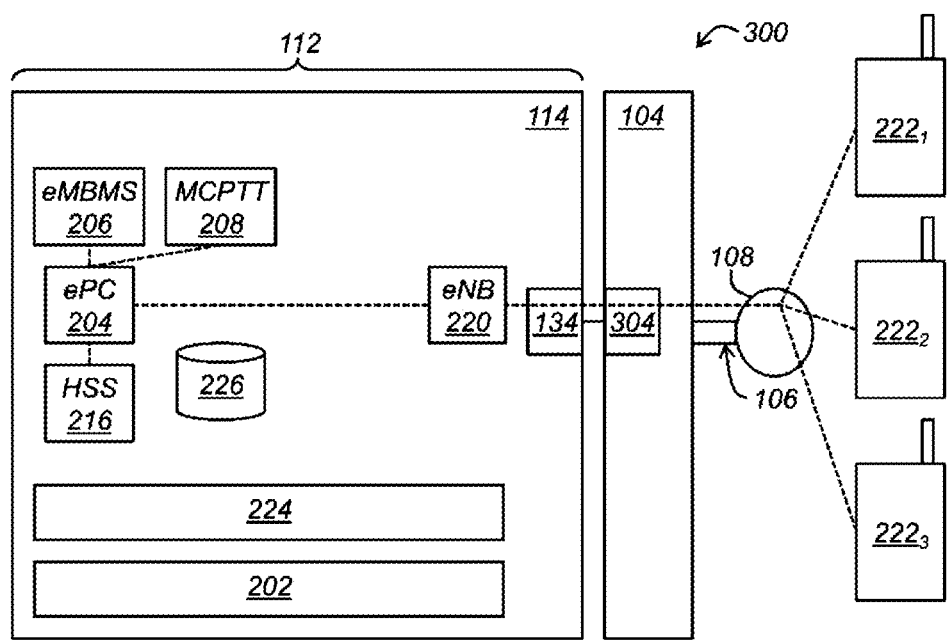

[Fig. 5]
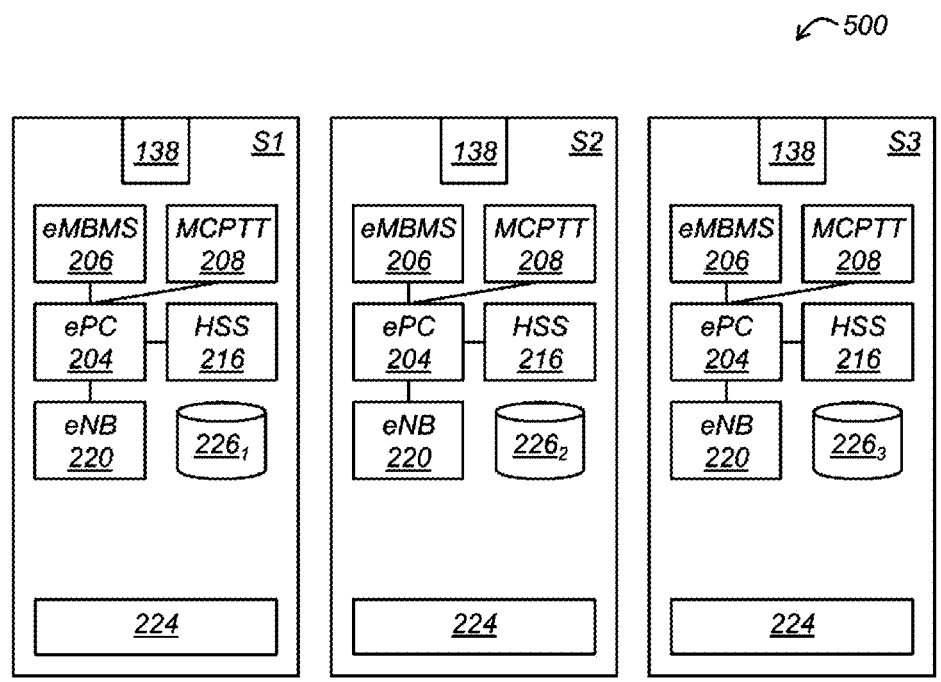

[Fig. 6]
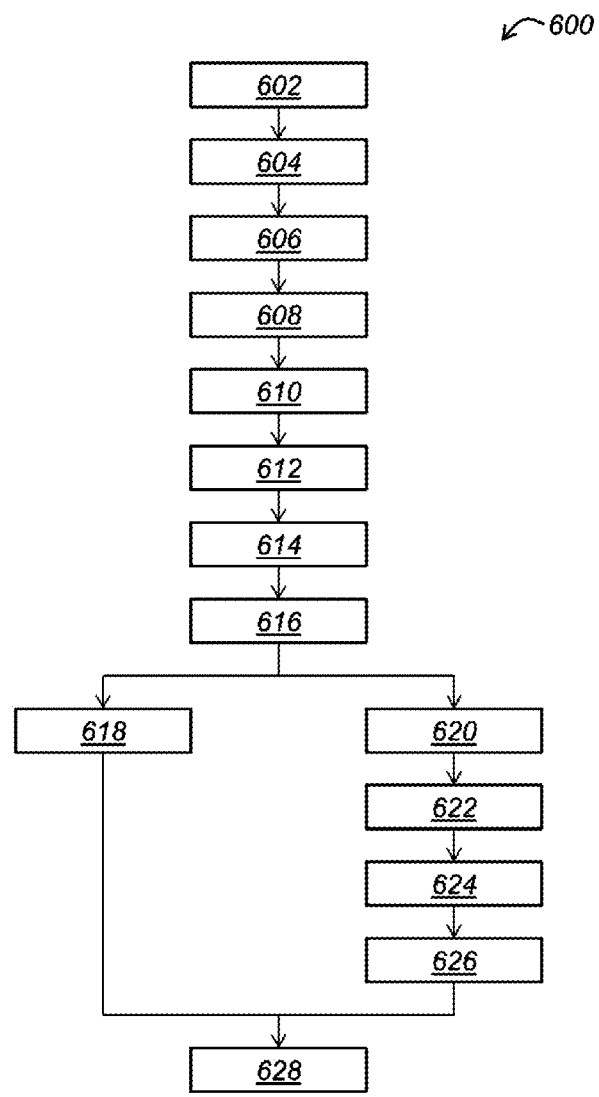

[Fig. 7]
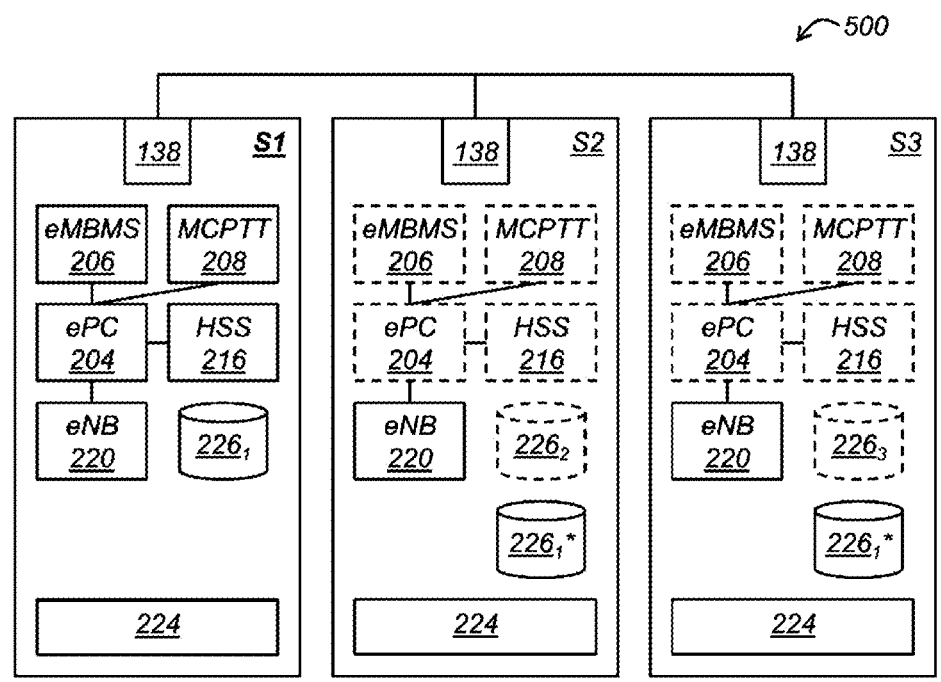

[Fig. 8]
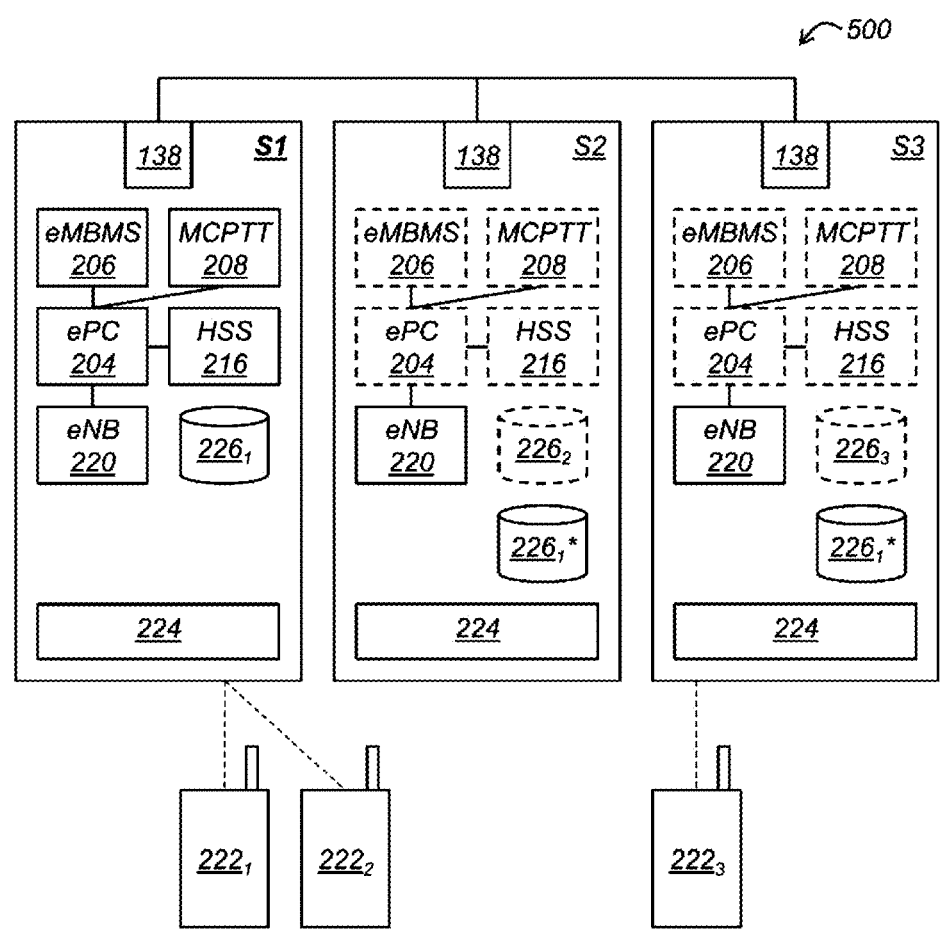

[Fig. 9]
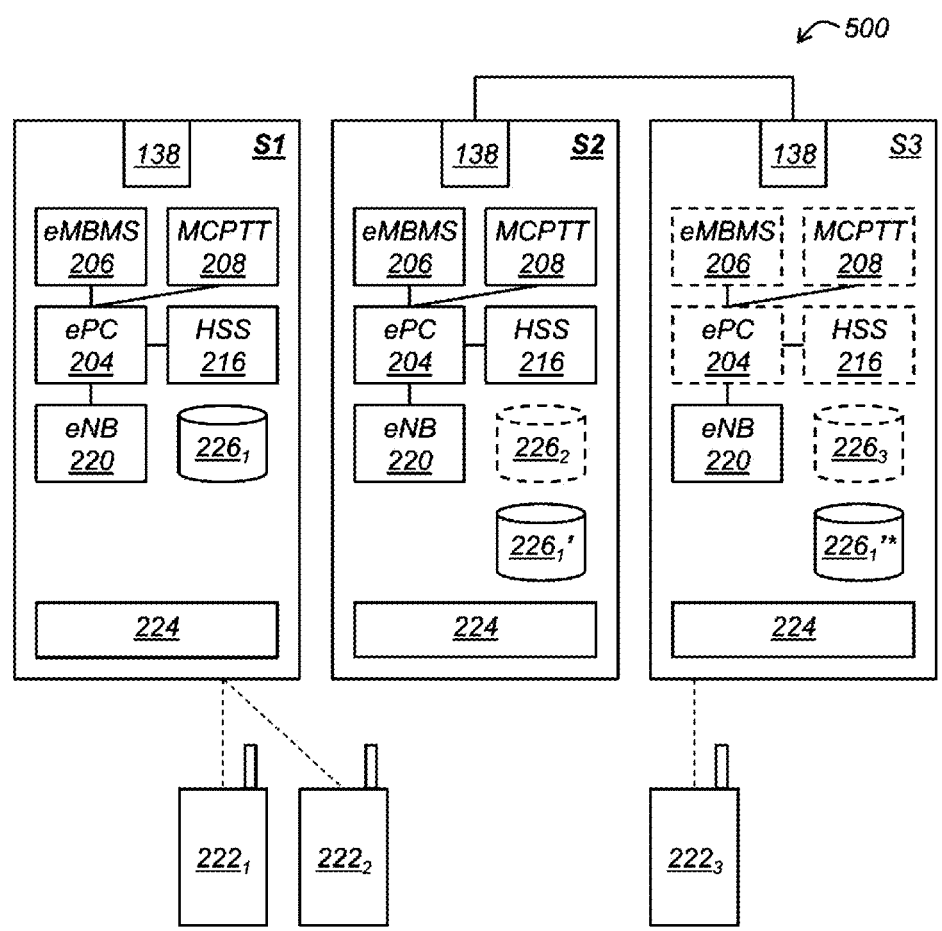

[Fig. 10]
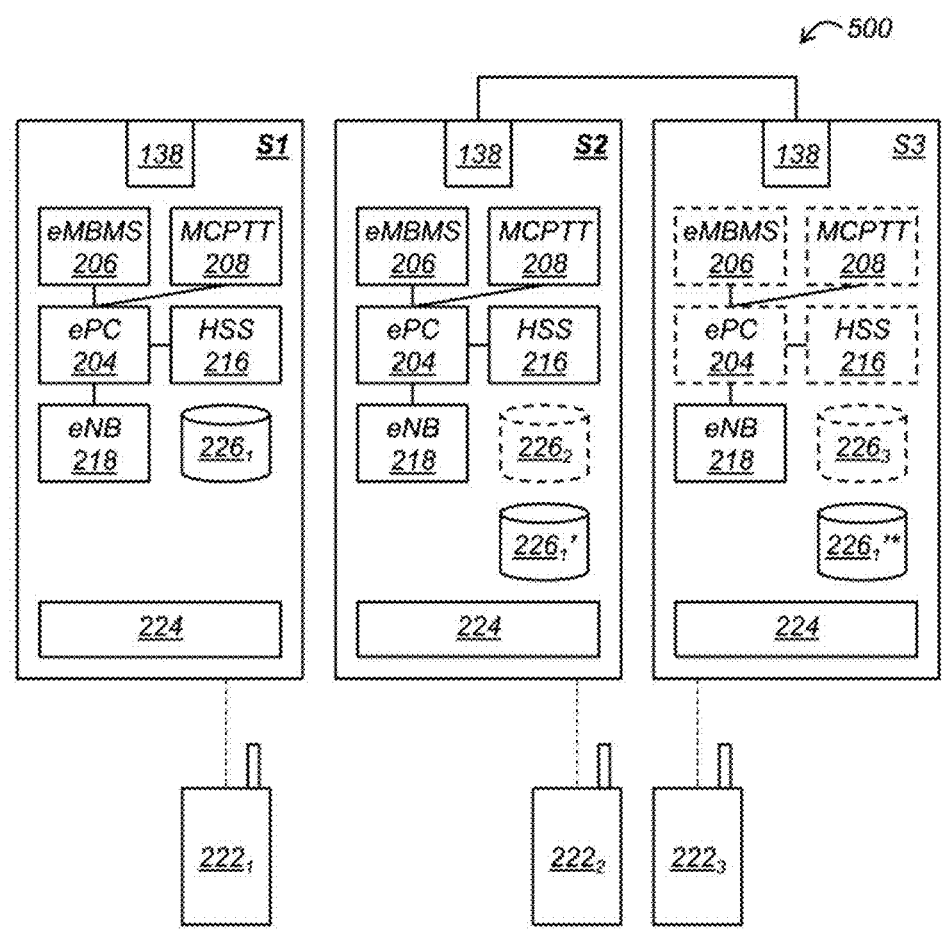

[Fig. 11]
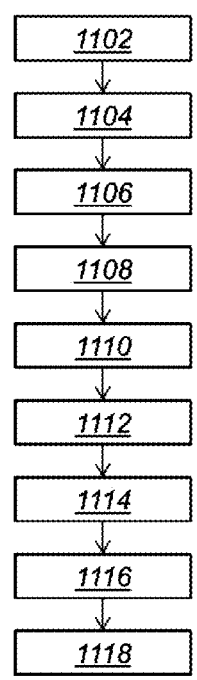

[Fig. 12]
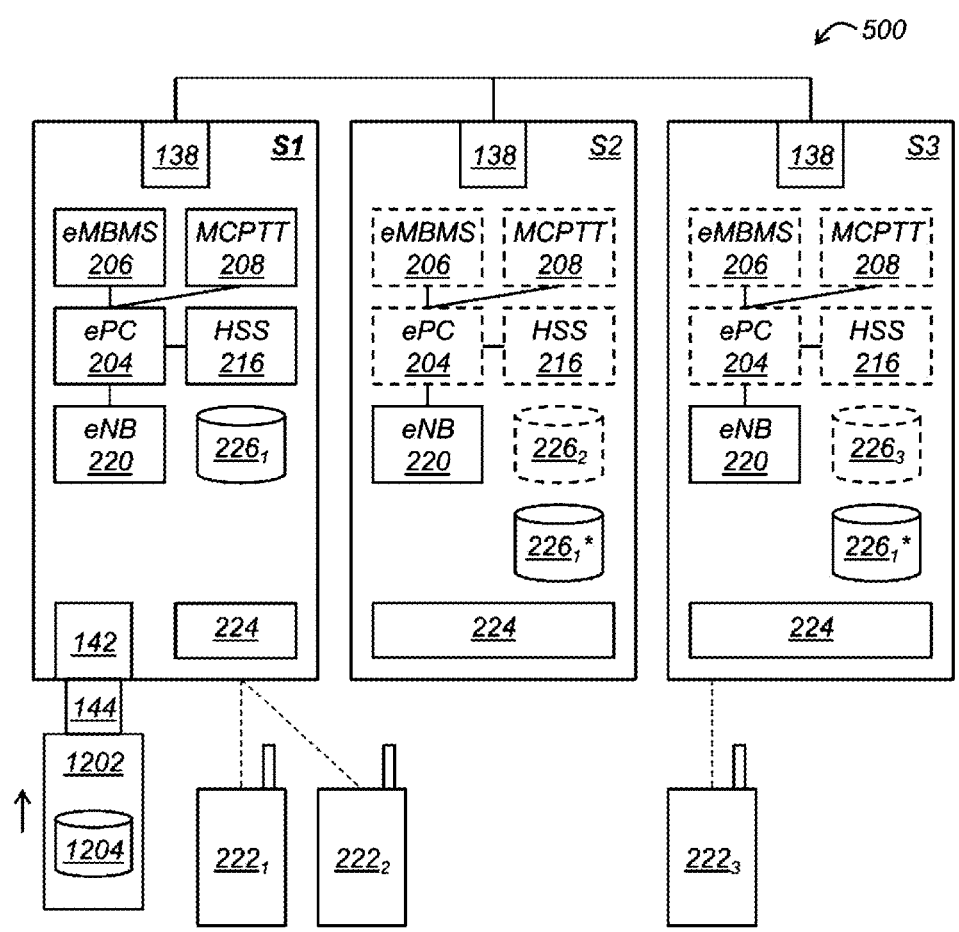

[Fig. 13]
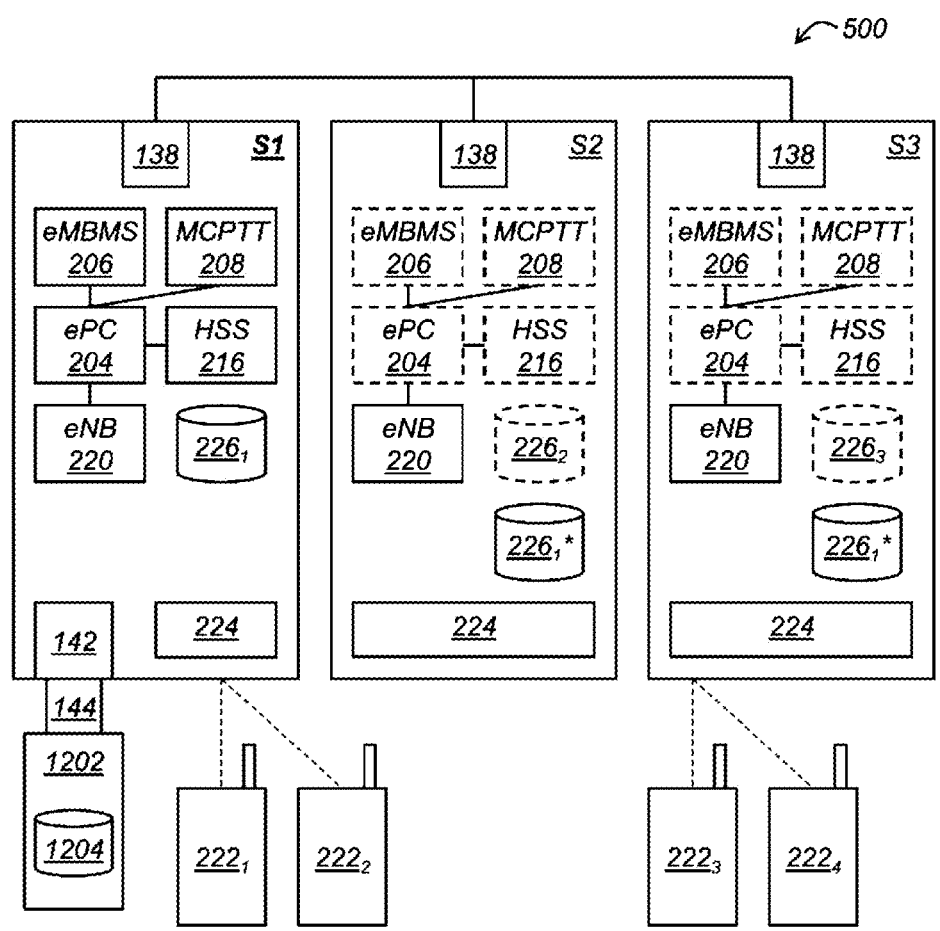

[Fig. 14]
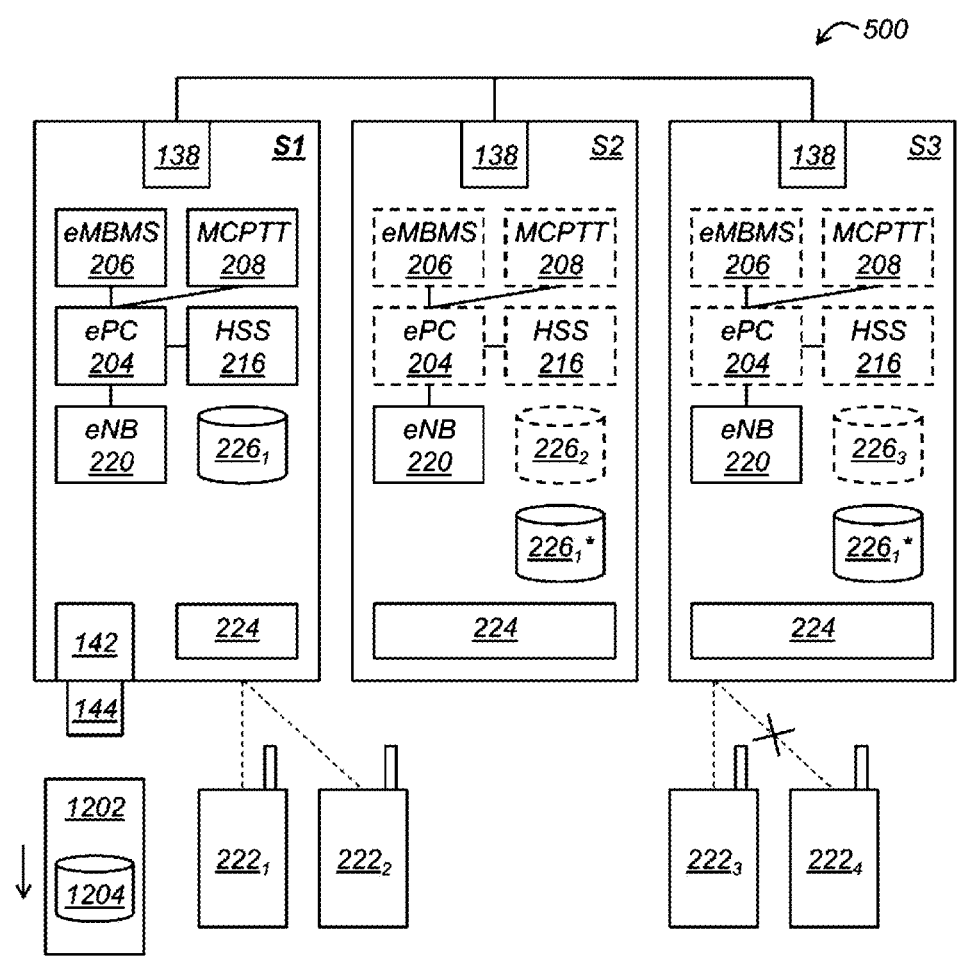

[Fig. 15]
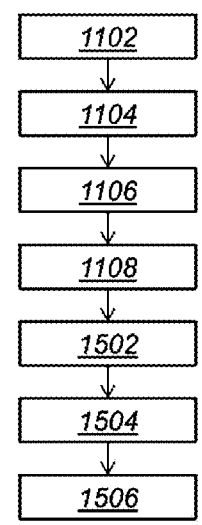

[Fig. 16]
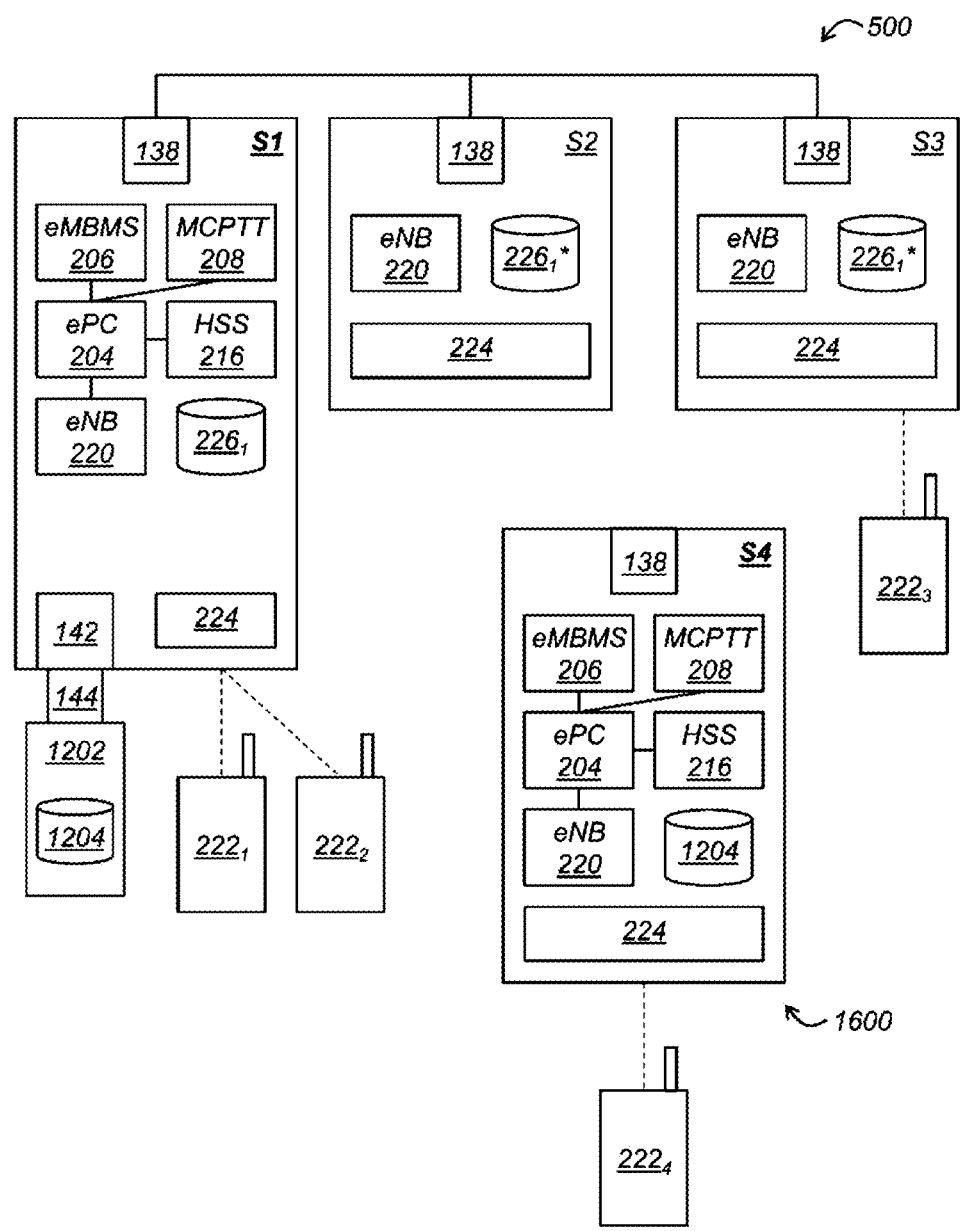

[Fig. 17]
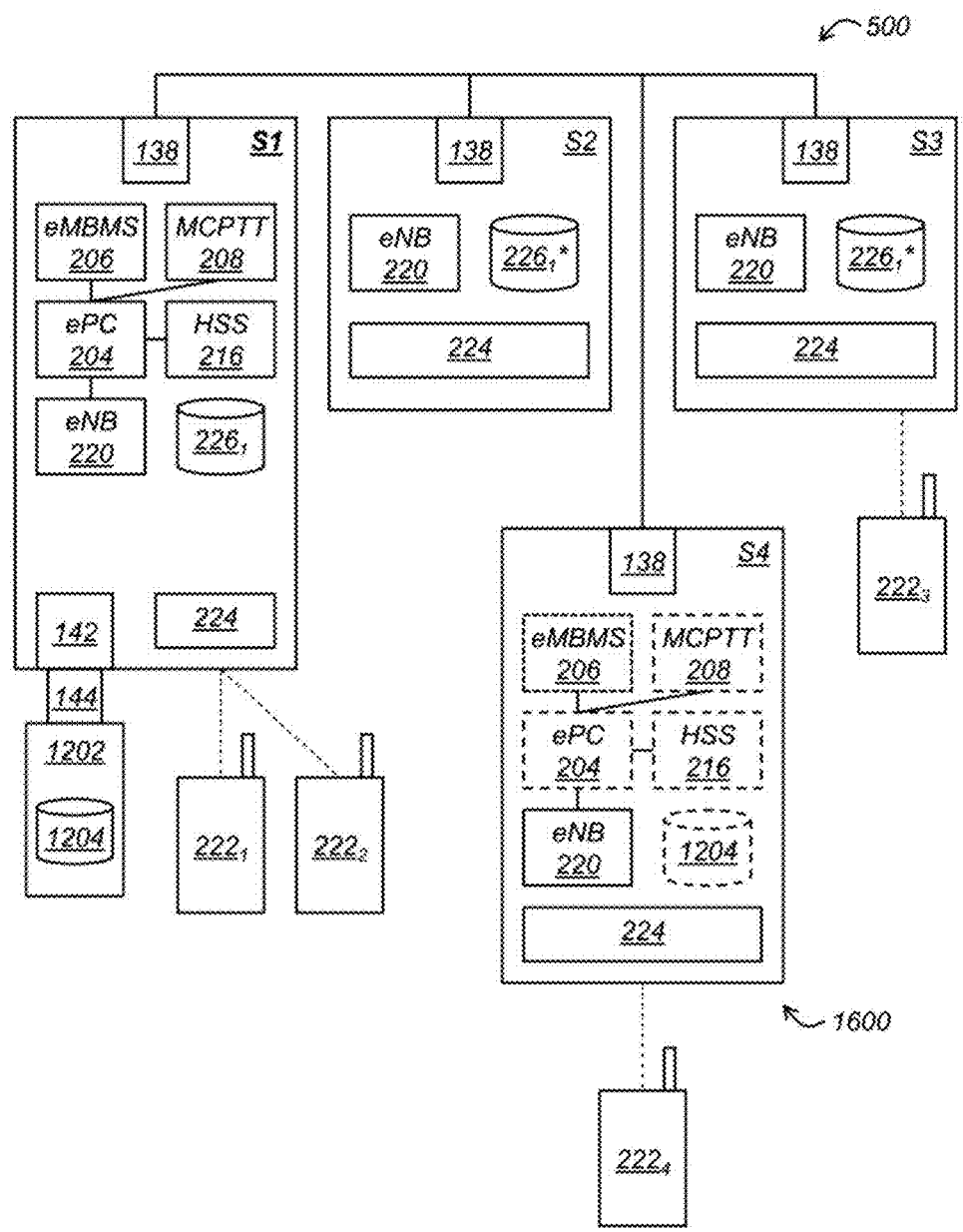

[Fig. 18]
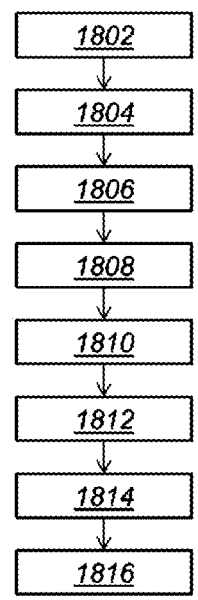

[Fig. 19]
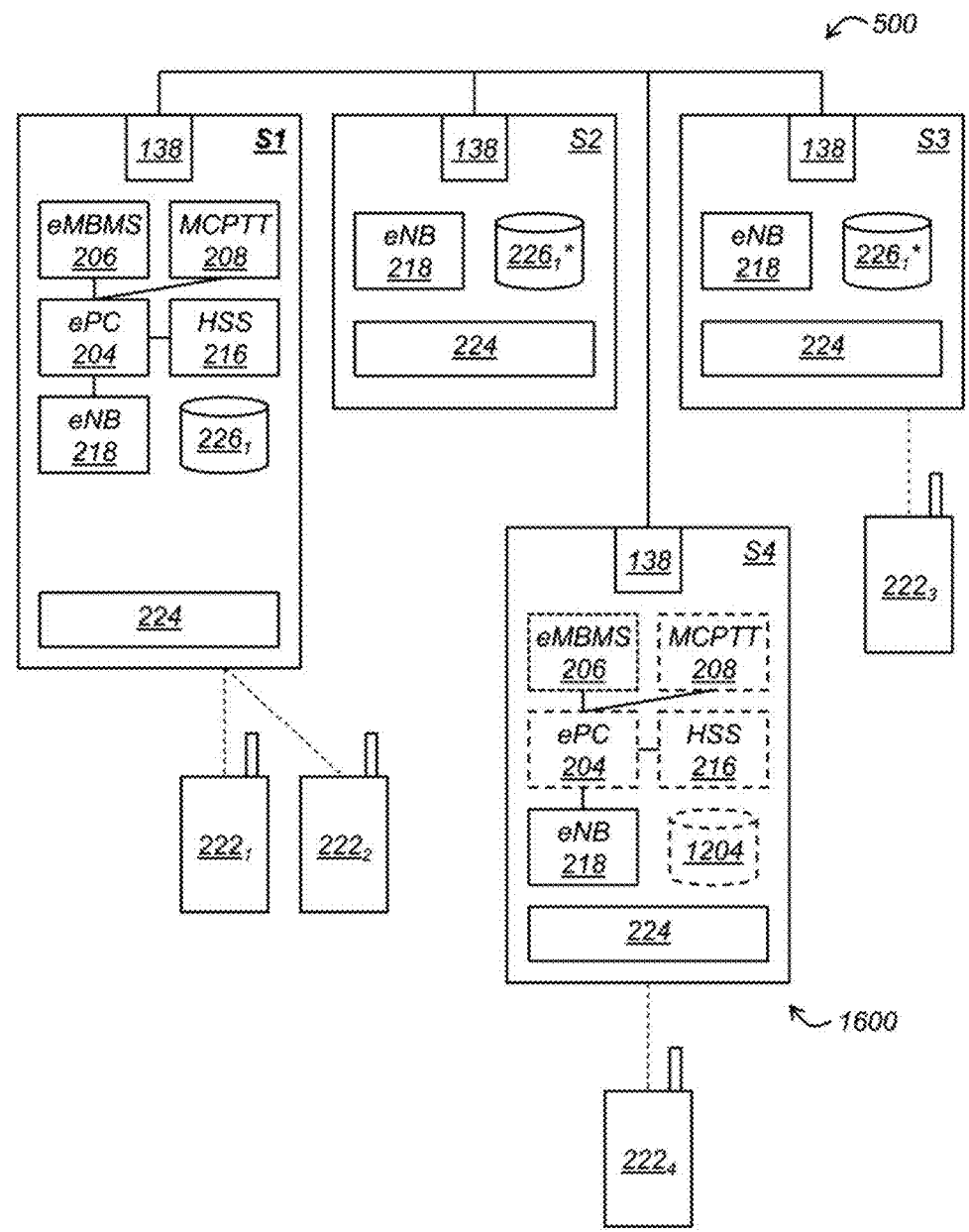

[Fig. 20]
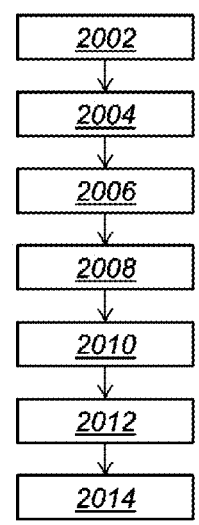

[Fig. 21]
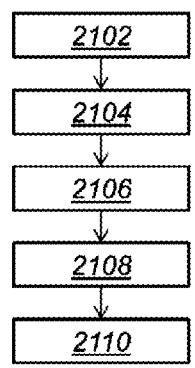
[Fig. 22]
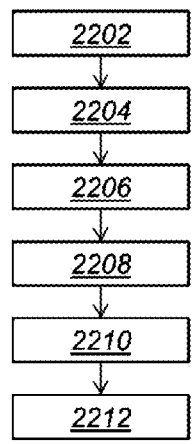

INSTALLATION OF A PRIVATE MOBILE RADIOCOMMUNICATION NETWORK, METHOD FOR FORMING SUCH AN INSTALLATION AND ASSOCIATED COMPUTER PROGRAM

CROSS-REFERENCE TO RELATED APPLICATIONS

This application claims the benefit of French Patent Application No. 1874022 filed Dec. 21, 2018, the disclosure of which is herein incorporated by reference in its entirety.

This invention relates to an installation of a private mobile radiocommunication, a method of performing such an installation and an associated computer program.

Private mobile radiocommunication (or PMR) network infrastructures are known in the state of the art, comprising a core network module, a subscriber server and a base station module.

It may be desirable to provide a scalable PMR infrastructure, in order to adjust its coverage area as required.

The invention therefore relates to a private mobile radio network installation, comprising several devices each comprising:
  a local private mobile radio network infrastructure comprising a core network module, a subscriber server and a base station module;
  a management system; and
  a network interface;
  in which the devices are connected therebetween via their network interfaces, and in which the management systems are designed to:
  choose one of the devices; and
  connect the base station module of each device to the core network module of the chosen device to form a distributed private mobile radio network infrastructure.

Thus, the number of devices can be changed to adjust the coverage area of the PRM installation. Additionally, when a device is not used in a PMR distributed infrastructure, it can still be used autonomously by creating its own local PMR infrastructure.

Optionally, the distributed infrastructure is designed to use, for its operation, operating data stored in the chosen device and comprising, on the one hand, a list of identifiers of mobile terminals authorized to attach to the distributed infrastructure and, on the other hand, for each of these mobile terminals, operating parameters, and wherein the management systems are further designed to make a synchronized copy of the operating data on each non-chosen device.

Since each device has the operating data of the distributed infrastructure, if that device is disconnected from the others (e.g. because it is too far away from them), it can use this operating data to provide some continuity of service to the mobile terminals connected to it. The installation is therefore resilient to the isolation of one or more devices.

Also optionally, following a disconnection of the chosen device, the management systems of the devices still connected therebetween are designed to:
  choose one of the always-connected devices;
  connect the base station module of each always-connected device to the core network module of the chosen device to form a new distributed private mobile radio network infrastructure; and
  provide the new distributed infrastructure with the synchronized copy of the operating data present in the chosen device so that the new distributed infrastructure uses this operating data for its operation.

Also optionally, the identifiers of the mobile terminals include an IMSI, and the operating parameters relating to each mobile terminal may include at least one of: an EMEI, an IP address and an identifier of the device to which that mobile terminal is connected.

Optionally, each of the local infrastructures complies with the LTE standard, so that each core network module is an evolved Packet Core, each subscriber server is a Home Subscriber Server, and each base station module is an evolved NodeB, as defined in this standard.

It is also proposed a process for forming a distributed private mobile radio network infrastructure from several devices each comprising:
  a local private mobile radio network infrastructure comprising a core network module, a subscriber server and a base station module;
  a management system; and
  a network interface;
  the devices being connected therebetween by their network interfaces, and the method comprising:
  choosing one of the devices; and
  connecting the base station module of each device to the core network module of the chosen device to form the distributed private mobile radio network infrastructure.

Also optionally, the method further comprises making a synchronized copy on each non-chosen device of operating data of the distributed infrastructure, recorded in the chosen device and comprising, on the one hand, a list of identifiers of mobile terminals authorized to connect to the distributed infrastructure and, on the other hand, for each of these mobile terminals, operating parameters.

Also optionally, the method may further include, following a disconnection of the chosen device:
  choosing one of the devices still connected therebetween; and
  connecting the base station module of each device always connected to the core network module of the chosen device to form a new distributed private mobile radio network infrastructure; and
  providing a new distributed infrastructure of the synchronized copy of the operating data present on the chosen device so that the new distributed infrastructure uses this operating data for its operation.

Also optionally, each of the local infrastructures complies with the LTE standard, so that each core network module is an evolved Packet Core, each subscriber server is a Home Subscriber Server, and each base station module is an evolved NodeB, as defined in this standard.

A computer program, downloadable from a communication network and/or recorded on a medium readable by computer and/or executable by a processor, is also proposed, characterized in that it comprises instructions for the execution of the steps of a method for forming a distributed private mobile radio communication network infrastructure according to the invention, when said program is executed on a computer.

The invention will be better understood by means of the following description, given only as an example and made with reference to the attached drawings wherein:

FIG. 1 is a schematic representation of the general structure, according to a first embodiment, of a transportable device implementing a local private mobile radiocommunication network infrastructure, FIG. 2 is a schematic representation of the software structure of the device of FIG. 1, FIG. 3 is a schematic representation of the general structure, according to a second embodiment, of a transportable device implementing a local private mobile radiocommunication network infrastructure, FIG. 4 is a schematic representation of the software structure of the device of FIG. 3, FIG. 5 is a schematic representation of the general structure of a private mobile radiocommunication installation, comprising several devices according to the preceding Figures, FIG. 6 is a block diagram illustrating the steps of a method of operation of the installation of FIG. 5, FIG. 7 represents the installation of FIG. 5 after the devices have been connected to each other, FIG. 8 represents the installation of FIG. 7 after the connection of the mobile terminals, FIG. 9 represents the installation of FIG. 8 after a chosen device has been disconnected, FIG. 10 represents the installation of FIG. 9 after the moving of one of the mobile terminals, FIG. 11 is a block diagram illustrating the steps of a first method of reconfiguration of the installation of FIG. 5, FIG. 12 represents the installation of FIG. 5 after introduction of an external storage device, FIG. 13 represents the installation of FIG. 5 after the connection of a mobile terminal, FIG. 14 represents the installation of FIG. 5 after the removal of the external storage device, FIG. 15 is a block diagram illustrating the steps of a second method for the reconfiguration of the installation of FIG. 5, FIG. 16 represents, on one hand, the installation of FIG. 5 after introduction of an external storage device and, on the other hand, another installation, FIG. 17 represents the installation of FIG. 16 after their association, FIG. 18 is a block diagram illustrating the steps of a method for associating the installation of FIG. 5 with another installation, FIG. 19 represents the installation of FIG. 5 associated with another installation, FIG. 20 is a block diagram illustrating the steps of a method for the reduction of interference, according to first and second embodiments, FIG. 21 is a block diagram illustrating the steps of a method for the reduction of interference, according to a third embodiment, FIG. 22 is a block diagram illustrating the steps of a method for the reduction of interference, according to a fourth embodiment, In reference to FIGS. 1 and 2, a transportable device 100 according to a embodiment, implementing a local private mobile radiocommunication network infrastructure (PMR) will now be disclosed.

The term transportable means, for example, that the device 100 has a bulk and weight allowing it to be transported by one person. For example, the device 100 is at the most 0.5 m³ and weighs 50 kg at most.

In reference to FIG. 1, the device 100 comprises, first, a housing 102. The housing 102 can, for example, be equipped with straps (not shown) or can be positioned on a support structure with straps in order to make it possible for one person to carry it on his back, like a backpack. The housing 102 can also be fastened to a wall (rigid) to which a mobile system for common federation can connect.

The device 100 further comprises, in this housing 102, a radio head 104 with at least one socket 106 accessible from the outside of the housing 102 and intended to be connected to a radio antenna 108 extending to the outside of the housing 102, so that the device 100 can cover a certain area of radio coverage. In the disclosed example, the radio head 104 has two sockets 106, respectively connected to two radio antennas 108. Alternatively, more sockets 106 can be provided. The radio head 104 further comprises, in the disclosed example, a network interface 110 in compliance with the CPRI (Common Public Radio Interface). Alternatively, the network interface 110 could be any radio sample exchange support interface from and to the radio head. In 5G, this could be an eCPRI, eth1G, or JESD/ADI or any other physical link with a sample exchange protocol. If the radio head is inserted into the housing, that can be another standard or host.

In the context of the CPRI standard, different physical levels (fiber or electric) and software protocols (ORI, host,) are possible.

The device 100 further comprises, always in the housing 102, a computing system 112 connected to the radio head 104 and comprising at least one x86 microprocessor and at least one memory associated with the x86 microprocessor(s). As is known, the family of x86 microprocessors includes microprocessors compatible with the Intel 8086 (registered mark) instructions. The benefit of using this family of microprocessors is that the software developed for a microprocessor of this family is easily transferable to another microprocessor of this family.

In the disclosed example, the computing system 112 comprises first and second computers 114, 116. Each computer 114, 116 comprises a motherboard 118, 120, an x86 microprocessor 122, 124 received by the motherboard 118, 120 and a main memory 126, 128 such as a RAM (Random Access Memory) also received by the motherboard 118, 120.

Each computer 114, 116 further comprises a mass memory 130, 132 such as a hard disk, connected to the motherboard 118, 120. The computers 114, 116 further comprise, respectively, two network interfaces 134, 136, for example like Ethernet, connected to each other in order to make it possible for the computers 114, 116 to communicate with each other. The first computer 114 further comprises, on one hand, a second network interface 138, for example, like Ethernet, and has one port 140, for example, like RJ45, accessible from outside of the housing 102 and, on the other hand, a bus 142, for example, like USB, with a port 144, for example, like USB, also accessible from the outside of the housing 102. With regard to the second computer 116, it further comprises a programmable logic circuit 146, like an FPGA ("Field-Programmable Gate Array") implementing a network interface 148 which complies, in the disclosed example, with the CPRI standard and is connected to the CPRI network interface 110 of the radio head 104 in order to make it possible for a second computer 116 and the radio head 104 to communicate with each other.

In reference to FIG. 2, the software structure of the computing system 112 will now be disclosed. As is known, this software structure contains computer code, which may be divided among several computing programs, and is intended to be copies into the main memory 126, 128 to which the x86 microprocessor, 122, 124 has direct access in order to execute this computer code.

Thus, the mass memory 130 of the first computer 114 contains, first of all, a Linux 202 (registered mark) operating system.

The mass memory 130 of the first computer 114 further contains computer code designed to be executed by the x86 microprocessor 122, for example, through the Linux 202 operating system so as to implement the following elements of the local infrastructure:

- a core network module 204,
- a broadcasting service module 206 connected to the core network module 204,
- a service module 208, connected to the core network module 204 and offering at least a PMR service, in the disclosed example, a Push To Talk or even Push To Transmit, or PTT service, and
- a subscriber server 216 connected to the core network module 204.

These elements are designed to use, for their operation, current operational data 226 recorded in the computing system 112, for example, in the mass memory 130 of the first computer 114. These current operational data can change over time, for example, can be modified and/or supplemented, for example, as a function of the operation of the local infrastructure.

In the Figures, the current operational data 226 are shown as separate from elements 204, 206, 208 and 216 of the local architecture. However, at least one part, or even all, of the current operations data 226 could be located in one or more of these elements 204, 206, 208 and 216.

These current operational data 226 comprise, for example, a current list of identifiers for mobile terminals authorized to connect to the local infrastructure. This current list is, for example, contained in the subscriber server 216. The identifiers are, for example, IMSIs (International Mobile Subscriber Identity) also each stored in a SIM (Subscriber Identity Module) card of the mobile terminal in question.

Current operational data 226 can further comprise, for each mobile terminal on the list, operational parameters. These operational parameters comprise, for example, one or more of the following data, for example, recorded in the subscriber server 216:

- a mobile terminal identifier such as the IMEI (International Mobile Equipment Identity).
- an international call number, for example, the MSISDN (Mobile Subscriber International ISDN Number), and
- the service(s) to which the terminal is subscribed, in particular, in the disclosed example, the PTT service.

The operational parameters may further comprise other parameters, such as, for example, an IP address (Internet Protocol) for the mobile terminal, which may be recorded in other components of the local infrastructure. They can also comprise application parameters, for example, used by the servers 206, 208. For example, for the server 208, these parameters can comprise a client profile and/or identifier (clientMC).

The operational data can, for example, further comprise application parameters such as a list of application clients (PTT or other application) or even profiles of application clients.

Default operational data can be provided in the device 100, for example, in the mass memory 130 of the first computer 114. These default operational data are designed to be retrieved at startup of the device 100 in order to be used during operation of the local infrastructure as current operational data 226. The default operational data can comprise, in particular, a default list of identifiers for mobile terminals authorized to connect to the local infrastructure.

The mass memory 130 of the first computer 114 further contains computer code designed to be executed by the x86 microprocessor 122, for example, through the Linux 202 operating system so as to implement the following management module 224: The functions of the management module are disclosed further below.

Furthermore, the mass memory 132 of the second computer 116 contains, first of all, a second Linux operating system 218.

The mass memory 132 of the second computer 116 further contains computer code designed to be executed by the x86 microprocessor 124, for example, through the Linux operating system 218 so as to implement a base station module 220 of the local infrastructure: In the disclosed example, this base station module 220 is connected to the network core module 204 via Ethernet network interfaces 134, 136.

The base station module 220 is designed to connect, via the network interfaces 148, 110 (CPRI in the disclosed example), the radio head 104 and the radio antenna (108), to any mobile terminal present in the coverage area of the device 100 and listed in the subscriber server 216, such as the mobile terminals $222_1$, $222_2$, $222_3$ shown in FIG. 2.

The base station module 220 is specifically designed to manage radiocommunications with mobile terminals $222_1$, $222_2$, $222_3$ and to route data between mobile terminals $222_1$, $222_2$, $222_3$ and the core network module 204.

The core network module 204 is specifically designed to verify, by consulting the subscriber server 216, that any mobile terminal searching to connect to the local infrastructure or even to use the services offered by service modules 206, 208, is authorized to do so. The core network module 204 is additionally designed to route data between service modules 206, 208 and the base station module 220. The core network module 204 is additionally designed to establish a communication path between two mobile telephones searching to communicate with each other.

In the disclosed example, the infrastructure complies with the LTE standard so that:

- the core network module 204 is an evolved Packet Core (ePC),
- the broadcast module 206 is an evolved Multimedia Broadcast Multicast Services (eMBMS),
- the subscriber server 216 is a Home Subscriber Server (HSS), and
- the base station module 220 is an evolved NodeB (eNB), as defined in this standard.

Alternatively, the infrastructure could be 3G or 5G or 3GPP or WiFi.

Additionally, the PTT service offered by service module 208 can be the Mission Critical Push To Talk (MCPTT) service.

PTT is a service supported by a compatible standard or one that can be supported by the LTE standard. But it can also be well supported on WiFi PTT is a possible application, but not the only one, and involves service and Qos on the LTE system.

An operating example of device 100 for implementing a local PMR structure will now be disclosed.

In the disclosed example, default operational data comprise a list of identifiers of mobile terminals authorized to connect to the local infrastructure, as well as, for each of them, a parameter indicating if the mobile terminal is authorized to use the PTT service. Table 1 below shows these default operational data—with the ID column grouping the IMSI identifiers (1, 2, 3 respectively for terminals $222_1$, $222_2$, $222_3$) and the PTT column grouping the parameters indicating whether or not the PTT service is authorized (O indicating said authorization):

TABLE 1

| ID | PTT |
|----|-----|
| 1  | O   |
| 2  | O   |
| 3  | O   |

Upon startup of device 100, the local infrastructure retrieves the default operational data in order to use them as current operational data. In particular, the subscriber server 216 retrieves the IMSI identifiers and the PTT service use authorizations.

When one of mobile terminals $222_1$, $222_2$, $222_3$ enters into the coverage area of device 100, a connection procedure with the local infrastructure is implemented. During this connection procedure, the mobile terminal in question exchanges data with the core network module 204 via the base station module 220, so that the core network module 204 can verify, by consulting the subscriber servers 216, that the mobile terminal in question is authorized to connect to the local infrastructure and to use the PTT service. In the disclosed example, the IMSI identifier of the mobile terminal and the authorization to use the PTT service are sought in the subscriber server 216 and, if found, this mobile terminal is authorized to connect to and to use the PTT service.

It will be understood that the UE IMSI identifier cannot be permanently linked to an application client. Then, the lists can be dissociated and linked, for example, at the moment where: 1. A UE is connected (and authenticated)—HSS/2. Then, at the application level where a client connects and is authenticated (—PTT application list or other application). Thus, a client (user) can, over time, use or share a UE with other user clients. But another implementation—for some or all users—is to always use the same UE (which is dedicated to them) and therefore, to always be associated with the same UE.

During this connection procedure, an IP address is additionally allocated to the mobile terminal. Thus, in the disclosed example, the current operational data 226 are modified in order to specify this IP address and an identifier for the device (in the present case, S1 for device 100) to which the mobile terminal is connected. Table 2 below illustrates the current operational data 226 after the connection of mobile terminals $222_1$, $222_2$, $222_3$.

TABLE 2

| ID | PTT | IP      | DEVICE |
|----|-----|---------|--------|
| 1  | O   | 1.1.1.1 | S1     |
| 2  | O   | 1.1.1.2 | S1     |
| 3  | O   | 1.1.1.3 | S1     |

After connecting to the local infrastructure, mobile terminals $222_1$, $222_2$, $222_3$ are then able to send telephone calls therebetween via the local infrastructure.

Additionally, mobile terminals $222_1$, $222_2$, $222_3$ can each launch a PTT application which communicates with service module 208 in order to use the PTT service so that, when the user of one of mobile terminals $222_1$, $222_2$, $222_3$ pushes a predetermined button on his mobile terminal, the latter enters transmission mode while the other mobile terminals enter receiver mode. In this configuration, the audio and/or video streams transmitted by the transmitting mobile terminal are transmitted to service module 208, which broadcasts them to the mobile terminals in receiver mode. In order to do this, in the example described, the PTT service uses the broadcast module 206. When the user releases the predetermined button, mobile terminals $222_1$, $222_2$, $222_3$ each enter a standby mode until a user pushes the predetermined button on his mobile terminal.

The application can support its own data corresponding to the preceding tables and managed concomitantly with the access terminals for its application clients.

In reference to FIGS. 3 and 4, a transportable device 300 according to a second embodiment, implementing a local PMR infrastructure will now be disclosed.

Device 300 is identical to device 100, except for the differences that will now be disclosed.

In reference to FIG. 3, the computer system 112 comprises only the first computer 114.

The radio head 104 comprises a programmable logic circuit 302, such as an FPGA, implementing a network interface Ethernet 304, connected to the network interface Ethernet 134 of computer 114, in order to make it possible for computer 114 and radio head 104 to communicate with each other. Alternatively, PCIe or other interfaces could be used.

In reference to FIG. 4, base station module 220 is installed on computer 114 and intended to be executed by the latter.

The operational example of device 100 disclosed above is applicable to device 300.

Since device 300 uses a single computer, instead of the two in device 100, it may have a reduced size and/or weight. In contrast, it could not be capable of managing as many subscribers as device 100.

In reference to FIG. 5, a PMR installation 500 will now be disclosed.

In general, a PMR installation according to this invention comprises one or more devices which can each be like those in FIGS. 1 and 2, or even like those in FIGS. 3 and 4. Thus, as was disclosed in reference to FIGS. 1 to 4, each installation device comprises, on the one hand, a local PMR installation comprising a core network module 204, a broadcast service module 206, a PTT service module 208, a subscriber server 216 and a base station module 220 and, on the other hand, a network interface 138, a management module 224, this/these module(s) 2224 forming a management system, also designated by reference 224, and default operational data.

In the disclosed example, installation 500 comprises several devices (three in the disclosed example, respectively bearing the references S1, S2, S3). The default operational data for these devices S1, S2, S3 bear different references, respectively $226_1$, $226_2$ and $226_3$, in order to distinguish them.

In reference to FIGS. 6 to 10, a first method 600 for operation of the installation 500 will now be disclosed.

During a step 602, devices S1, S2, S3 are connected therebetween via their network interfaces 138 by a network connection (backhaul). This connection can be wired or even, preferably, wireless.

During a step 604, the management system 224 chooses one of devices S1, S2, S3. In the disclosed example, device S1 is chosen. For example, a priority rank is first attributed to each device S1, S2, S3 and recorded in this device S1, S2, S3. The chosen device is then the one with the highest priority rank.

During a step 606, the management system 224 deactivates the core network module 204, the service modules 206, 208, the subscriber server 216 and the operational data $226_2$, $226_3$ for each device S2, S3 not chosen.

During a step 608, the management system 224 connects the base station module 220 of each device S1, S2, S3 to the core network module 204 of chosen device S1 in order to form a distributed PMR infrastructure. In particular, the base station module 220 for each device S2, S3 not chosen is connected via network interfaces 138.

During a step 610, chosen device S1 recovers default operational data 226 that it contains so that its modules 204, 206, 208 and its server 216 may use it. In the disclosed example, the default operational data $226_1$ are the same as those disclosed above for device 100 and are recalled in table 3 below:

TABLE 3

| ID | PTT |
|----|-----|
| 1  | O   |
| 2  | O   |
| 3  | O   |

During a step 612, the management system 224 creates, on each not chosen device S2, S3, a synchronized copy $226_1*$ of the operational data $226_1$ of chosen device S1. This means, in particular, that management system 224 keeps this/these copies $226_1*$ up to date in case of modification over time of original operational data $226_1$.

The result of steps 602 to 612 is shown in FIG. 7, with the deactivated components in dotted lines.

During a step 614, mobile telephones $222_1$, $222_2$, $222_3$ connect to the distributed infrastructure. To do this, a procedure for connection to the distributed infrastructure is implemented, with this connection procedure being similar to that disclosed above for device 100, by replacing the local architecture with distributed architecture.

Operational data $226_1$ are therefore modified as a result (along with the synchronized copies $226_1*$), as shown in table 4:

TABLE 4

| ID | PTT | IP      | DEVICE |
|----|-----|---------|--------|
| 1  | O   | 1.1.1.1 | S1     |
| 2  | O   | 1.1.1.2 | S1     |
| 3  | O   | 1.1.1.3 | S3     |

The IP address can (in certain implementation cases where the client is reactive on a single server) be modified by the server. The client identity must be valid and active. Furthermore, in the disclosed example, the IP address can be either static or dynamic so as to be able to change.

The result of step 614 is shown in FIG. 8.

During a step 616, the device S1 is disconnected from devices S2, S3.

During a step 618, device S1 continues to operate in order to form a first new PMR infrastructure, without the base 220 stations of devices S2 and S3.

In parallel, During a step 620, the management system 224 of devices S2, S3, always interconnected, chooses a device from among the always connected devices S2, S3. In the disclosed example, device S2 is chosen.

During a step 622, the management system 224 deactivates the core network module 204, the service modules 206, 208 and the subscriber server 216 for each non-chosen device S3 and activates the core network module 204, the service modules 206, 208 and the subscriber server 216 of the chosen device S2.

During a step 624, the management system 224 connects the base station module 220 of each device S2, S3 to the core network module 204 of chosen device S2 in order to form a second new PMR infrastructure, which, in the disclosed example, is an infrastructure distributed over devices S2, S3.

During a step 626, the management system 224 provides elements 204, 206, 208, 216 of the chosen device S2 with the copy 226* of the operational data present on the chosen device S2, so that these elements may use these operational data for the operation of the distributed PMR infrastructure.

The result of steps 616 to 626 is shown in FIG. 9. From this moment, there therefore exist two PMR infrastructures: a first formed by the S1 device and a second formed by devices S2 and S3. These two PMR infrastructures then independently evolve from each other so that the operational data can diverge. Thus, in FIG. 9, the operational data used by elements 204, 206, 208, 216 of device S2 bear the reference $226_1$ to distinguish them from operational data $226_1$ of device S1. Additionally, in the second PMR infrastructure, a synchronized copy $226_1*$ of operational data $226_1$ is created by the management system 224 on each non-chosen device S3.

During a step 628, the mobile telephone $222_2$ leaves the coverage area of device S1 and enters the coverage area of device S2.

Since the operational data $226_1$ result from the operational data $226_1$, before cutting, they comprise the list of authorized mobile terminals for the original PMR infrastructure and the parameters for all of these mobile terminals. Thus, mobile terminal $222_2$ is authorized to connect to the second PMR infrastructure, and this change in the PMR infrastructure can be made while minimizing service interruption for mobile terminal $222_2$.

The result of step 628 is shown in FIG. 10.

In reference to FIGS. 11 to 14, a first method 1100 for reconfiguration of the installation 500 will now be described.

Initially, installation 500 is in the state shown in FIG. 8, i.e., it implements a distributed PMR infrastructure, in which device S1 is chosen. This distributed PMR infrastructure uses current operational data $226_1$ which comprise the current list of identifiers of mobile terminals and, for each one, the operational parameters.

During a step 1102, shown in FIG. 12, an external storage device 1202 (a USB drive in the disclosed example), is received in the external port 144 of one of devices S1, S2, S3 of installation 500 (preferably, the chosen device S1, as in the disclosed example). This external storage device 1202 contains additional operational data 1204 comprising an additional list of identifiers of mobile terminals and possibly, for each one of these terminals, additional operational parameters.

The additional operational data 1204 are, for example, those shown in table 5 below:

TABLE 5

| ID | PTT |
|----|-----|
| 4  | O   |
| 5  | O   |
| 6  | N   |

During a step 1104, the management system 224 detects the reception or presence of the external storage device 1204 in the external port 144.

The following steps 1106 and 1108 are, for example, implemented automatically as a consequence of the detection of step 1104. Alternatively, in consequence of the detection of step 1104, the management system 224 requires a user validation and the following steps 1106 and 1108 are implemented if the user is validated.

During a step 1106, the management system 224 retrieves, from the external storage device 1202 received in the external port 144, the additional operational data 1204 and provides it to chosen device S1.

During step 1108, the management system 224 modifies the current operational data $226_1$ of device S1 using the additional operational data 1204, in particular the current list is modified using the additional list. In the disclosed example, the modification is a merger of the current and additional data involving, in particular, a merger of current and additional lists. Thus, the identifiers of the additional list (which are not already present in the current list) are added to the current list, with, if applicable, their associated operational parameters. These current operational data $226_1$, after modification, are thus used by elements 204, 206, 208, 216 of chosen device S1. The current operational data $226_1$, after modification, from the disclosed example, are shown in table 6 below:

TABLE 6

| ID | PTT | IP | DEVICE |
|---|---|---|---|
| 1 | O | 1.1.1.1 | S1 |
| 2 | O | 1.1.1.2 | S1 |
| 3 | O | 1.1.1.3 | S3 |
| 4 | O | | |
| 5 | O | | |
| 6 | N | | |

Cases of collision (the same identifier appearing in both lists) are processed according to predetermined rules. For example, preferably, the parameters present in the current operational data for the identifier in collision are stored, while the parameters present in the additional operational data for this identifier in collision are rejected.

The merger can be temporary (it is necessary to save the path for the main list and the additional list) or not (a true merge, in base $226_1$). In the first case, for example, a return to the initial state is possible. In the second case, for example, reinitializing the list at the next startup is possible (for example, by inserted USB port requiring the consideration of a total new, current list).

Additionally, the merge can be temporary and, therefore, reversible. In this case, it is specified to save a path to the main and secondary lists.

During a step 1110, shown in FIG. 13, a mobile telephone $222_4$, with the identifier 4, connects to device S3 and the connection procedure disclosed previously is implemented. During this connection procedure, the mobile terminal $222_4$ exchanges data with the core network module 204 of the chosen device S1, so that this core network module 204 can verify, by consulting the subscriber server 216, that the mobile terminal $222_4$ is authorized to connect to the local infrastructure and to use the PTT service. Since the identifier of this mobile terminal $222_4$ appears in the current list $226_1$ after modification and is associated with a use authorization for the PTT service, mobile terminal $222_4$ is authorized to connect to and use the PTT service.

The following steps 1112 to 1118 are shown in FIG. 14.

During step 1112, the external storage device 1202 is rendered inaccessible to installation 500. In the disclosed example, the external storage device 1202 is removed from the external port 144, for example, by a user. Alternatively, the external storage device 1202 is rendered inaccessible by disconnecting it by software (software disconnect operation known as unmount), without needing to be physically removed from the external port 144.

During a step 1114, the management system 224 detects the inaccessibility of the external storage device 1202. For example, the management system 224 detects the removal, or even the software unmount of the external storage device 1202.

During a step 1116, automatically and as a consequence of the detection of the inaccessibility of the external storage device, the management system purges the current operational data 1302 by purging the current list in order to revert to the current list before modification and deleting the operational parameters associated with the deleted identifiers.

In the disclosed example, the current operational data $226_1$ after purging are shown in table 7 below:

TABLE 7

| ID | PTT | IP | DEVICE |
|---|---|---|---|
| 1 | O | 1.1.1.1 | S1 |
| 2 | O | 1.1.1.2 | S1 |
| 3 | O | 1.1.1.3 | S3 |

During a step 1118, since the identifier of terminal $222_4$ is no longer present in the list of identifiers of current operational data $226_1$, it is no longer authorized to use the PMR infrastructure and is therefore disconnected at the initiative of the latter.

It will be understood that the method 1100 is also applicable to a system comprising a single autonomous device like device 100 or device 300.

Alternatively, step 1108 of modification of the current list could comprise replacement of the current list by the additional list.

Additionally, a similar method could be implemented when the additional operational data are on a remote server connectable by LAN/wifi/4G/bluetooth/Network, or even on any accessible storage element, and which serves as an example for initializing a computer system (by booting up, for example), so that the remote server, a hard disk (removable, like a USB, SC card, or not removable, like local HDD/SSD hard disk accessible by a human), DC, DVD, The application data (MCPTT or other(s)) can use the same concept of reconfiguration of lists.

In reference to FIGS. 15 to 17, a second method 1500 for reconfiguration of the installation 500 will now be described.

This method 1500 includes, first of all, steps 1102, 1104, 1106 and 1108 of method 1100.

However, as shown in FIG. 16, in method 1500, the additional operational data 1204 are the current operational data used in another PMR installation 1600 (comprising a single device S4 in the disclosed example).

The method 1500 then comprises steps 1502, 1504 and 1506 shown in FIG. 17.

During a step 1502, the other installation 1600 is connected to installation 1500. In the disclosed example, devices S1 to S4 are connected to each other via their network interfaces 138 by a network connection.

During a step 1504, the management system 224 (grouping the management modules 224 of both installations 500 and 1600) deactivates the core network module 204, the service modules 206, 208 and the subscriber server 216 for each device of installation 1600 (device S4 in the disclosed example).

During a step 1506, the management system 224 connects the base station module 220 of each device of installation 1600 (device S4 in the disclosed example) from the core network module 204 of the chosen device S1 of installation 500 so as to form a new distributed PMR infrastructure, federating the two installations 500, 1600.

Since the current operational data $226_1$ comprise the operational data 1204 of installation 1600, the mobile terminals connected to installation 1600 can connect to the federation of installations 500 and 1600.

In reference to FIGS. 18 and 19, a method, 1800 of the federation of installation 500 with at least one other installation (installation 1600 described previously in the disclosed example) will now be described.

Initially, installation 500 is in the state shown in FIG. 8, i.e., it implements a distributed PMR infrastructure, in which device S1 is chosen. This distributed PMR infrastructure uses current operational data $226_1$ which comprise the current list of identifiers of mobile terminals and, for each one, the operational parameters.

The following steps are illustrated in FIG. 19.

During a step 1802, installation 1600 is connected to installation 500. In the disclosed example, devices S1 to S4 are connected to each other via their network interfaces 138 by a network connection.

During a step 1804, the management system 224 (grouping the management modules 224 of installation 500) detects the connection of installation 1600 and requires a user validation and the following steps are implemented in the case of validation of the user.

During a step 1806, the management system 224 retrieves, from installation 1600 (and, more specifically, in the disclosed example, from device S4), through the network connection, the additional operational data 1204 and provides them to the chosen device S1.

During a step 1808, the management system 224 modifies the current operational data $226_1$ of device S1 using the additional operational data 1204, in particular the current list is modified using the additional list. In the disclosed example, the modification is a merger of the current and additional data involving, in particular, a merger of current and additional lists. Thus, the identifiers of the additional list (which are not already present in the current list) are added to the current list, with, if applicable, their associated operational parameters. These current operational data $226_1$, after modification, are thus used by elements 204, 206, 208, 216 of chosen device S1. The current operational data 2261, after modification, from the disclosed example, are therefore illustrated in table 6 above.

Cases of collision (the same identifier appearing in both lists) are processed according to predetermined rules, as explained for method 1100.

During a step 1810, the management system 224 (grouping the management modules 224 of both installations 500 and 1600) deactivates the core network module 204, the service modules 206, 208 and the subscriber server 216 for each device of installation 1600 (device S4 in the disclosed example).

During a step 1812, the management system 224 connects the base station module 220 of each device of installation 1600 (device S4 in the disclosed example) to the core network module 204 of chosen device S1 of installation 500 so as to form a new distributed PMR infrastructure, federating the two installations 500, 1600.

Since the current operational data $226_1$ comprise the operational data 1204 of installation 1600, the mobile terminals connected to installation 1600 can connect to the federation of installations 500 and 1600.

During a step 1814, installation 1600 is disconnected from installation 500.

During a step 1814, the management system 224 (grouping the management modules 224 of installation 500) detects this disconnection.

During a step 1816, automatically and as a consequence of the detection of the disconnection, the management system 224 purges the current operational data 1204 by purging the current list in order to revert to the current list before modification and deleting from it the operational parameters associated with the deleted identifiers.

Alternatively, step 1816 of purging could also be manually forced by a user on both sides (for example, on installation 500 or even on installation 1600), or be executed during a reset or even during the next startup, depending on the configuration.

It will be understood that, in an alternative embodiment, step 1808 of modification of the current list could comprise replacement of the current list by the additional list.

In reference to FIG. 20, a method 2000 for the reduction of interference caused by a PMR infrastructure, according to a first embodiment, will now be described. The PMR infrastructure is, for example, implemented by a device such as device 100, or even device 300, or even by an installation such as installation 500 federating several devices. Thus, the PMR infrastructure comprises, in particular, a core network module 204, and at least on base station 220, to which mobile terminals, such as mobile terminals $222_1$ $222_5$, can connect.

Steps 2002 to 2012 following are executed by one or each of several mobile terminals connected to the base station 220.

During a step 2002, the mobile terminal in question receives a radiocommunication downlink signal transmitted by the base station 220. This downlink signal occupies a predefined frequency band used by the base station 220 and the mobile terminal in order to communicate therebetween.

During a step 2004, the mobile terminal determines at least one characteristic of the received downlink signal and transmits this characteristic(s) to the base station 220. For example, one or more of the following characteristics are determined and transmitted: a Signal to Noise Ratio (SNR), a Signal to Interference and Noise Ratio or SINR, a Reference Signal Received Power (RSRP) and a Reference Signal Received Quality (RSRQ).

During a step 2006, the base station 220 receives a radiocommunication uplink signal transmitted by the mobile terminal. This uplink signal occupies a predefined frequency band used by the base station 220 and the mobile terminal in order to communicate therebetween.

Frequency bands for downlink and uplink signals can be identical, for example, in the case of time multiplexing, or even different, for example, in the case of frequency multiplexing.

During a step 2008, the base station 220 determines at least on characteristic of the received uplink signal. For example, as for the downlink signal, the characteristics comprise one or more from among: SNR, SINR, RSRP and RSRQ.

During a step 2010, the base station 220 determines a distance separating it from the mobile telephone. For example, timing calculated during TA (Timing Alignment Procedures) protocol sequences in 3GPP.

During a step 2012, the base station 220 searches a disturbance in the frequency band of the downlink signal and in the frequency band of the uplink signal, using the characteristics of the uplink and downlink signals obtained by the base station 220.

For example, the SNR of the downlink signal is compared to a threshold, called the downlink threshold, and the SNR of the uplink signal is compared to a threshold, called the uplink signal. If one of the two SNRs is bad, i.e., less than the associated threshold, the presence of a disturbance affecting the mobile terminal in question is detected.

If several characteristics are extracted from each signal, downlink and uplink, these characteristics are, for example, grouped into a global characteristic that can be compared to a threshold. Alternatively, each characteristic is compared to an associated threshold and the presence of a disturbance is detected when a predetermined number of characteristics, for example, at least one, or even all, cross their threshold. Alternatively still, more complicated decision criteria, applied to the characteristic(s) obtained by the base station 220 can be used.

Preferably, the search for a disturbance considers the distance between the base station 220 and the mobile terminal. For example, each threshold depends on this distance. For example, in the case of the SNR, the threshold decreases with distance. In fact, the farther the mobile terminal is from the base station 220, the worse is the SNR, i.e., the smaller it is. Thus, it is normal to find a weak SNR for a greater distance, without this implying the presence of a disturbance.

During a step 2014, in the case of detection of a disturbance in the frequency band of the uplink signal and/or the downlink signal for at least one mobile terminal connected to the base station 220, the base station 220 decreases its transmission power at least in the frequency band used by the base station to transmit downlink radiocommunication signals to the connected mobile terminals.

In fact, the presence of a disturbance can indicate the presence of a disturbing device transmitting in the same frequency band as the PMR infrastructure. However, it frequently occurs that several PMR infrastructures are used at the same time, within the same area. Thus, in this context, it often occurs that the disturbing device is a base station of another PMR infrastructure. Thus, the fact that the base station 220 decreases its transmission power makes it possible to reduce the interference caused by this base station 220 on the communications of the other PMR infrastructure.

It is possible to provide several thresholds of the user s choice before choosing to reduce the power, for example:—threshold 1, Normal/max. performance;—threshold 1, Interferences—max. coverage;—threshold 3: interferences—medium coverage (reduced power);—threshold 4: interferences—max. speed—max. power reduction.

In a second embodiment, steps 2002 to 2010 are executed for each one of a plurality of mobile terminals connected to the base station 220.

Furthermore, during step 2012 of searching a disturbance, the SNRs of the uplink and downlink signals of a first mobile terminal are, for example, respectively compared to the SNRs of the downlink and uplink signals of a second mobile terminal, farther from the base station than the first mobile terminal (according to their distances from the base station 220 obtained by the latter). If at least one of the SNRs (preferably both) of the first mobile terminal is less than the corresponding SNNR of the second mobile terminal, the presence of a disturbance is detected. In fact, in the absence of a disturbance, the SNR of the mobile terminals should increase when nearing the base station. Thus, when this is not the case, a disturbance which may be coming from another PMR infrastructure, is degrading the SNR.

In reference to FIG. 21, a method 2100 for the reduction of interference according to a third embodiment, will now be described.

During a step 2102, the base station 220 suspends, for at least a predefined interval of time, the transmission of the downlink signal in the frequency band dedicated to the downlink signals.

The use of several intervals makes it possible to avoid have too long a cut-off transmission time which leads to a loss of connection of the terminals.

For example, a 20 ms cut-off every 500 ms for 5 sec, rather than 20*2*5=200 ms cutoff, which risks the loss of communication, is better.

During a step 2104, the base station 220 monitors the frequency band in order to receive an ambient radiocommunication signal contained in this frequency band and coming from the environment.

For example, the base 220 station can comprise a transmission antenna dedicated to the transmission of downlink signals and a reception antenna dedicated to the reception of uplink signals, as well as an analog/digital converter connected to these antennas. In this case, the converter can be designed to invert its operations for the transmission antenna, so as to acquire the ambient signal reaching the transmission antenna. Alternatively, an additional acquisition card can be provided, connected to the transmission antenna in order to acquire the ambient signal reaching the transmission antenna.

During a step 2106, the base station 220 determines at least one characteristic of the received ambient signal. For example, a power of the ambient signal is determined.

During a step 2108, the base station 220 searches a disturbance in the frequency band of the downlink signals, using the characteristic(s) of the ambient signals obtained by the base station 220.

For example, the power of the ambient signal is compared to a threshold. If this power is greater than the threshold, the presence of a disturbance is detected. In fact, if the power is greater than the threshold, the environment is very noisy, which could be caused by another PMR infrastructure.

During a step 2110, in the case of detection of a disturbance in the frequency band of the downlink signals, the base station 220 decreases its transmission power at least in the frequency band of the downlink signals.

In reference to FIG. 22, a method 2200 for the reduction of interference, according to a fourth embodiment, will now be described.

During a step 2202, the base station 220 requests all the mobile terminals connected to suspend, for example, during at least a predefined interval of time, the transmission of the uplink signals in the frequency band dedicated to uplink signals.

During a step 2204, in response to the request of the base station 220, the connected mobile terminals suspend, during the interval(s) of predefined time, the transmission of uplink signals.

During a step 2206, the base station 220 monitors the frequency band dedicated to uplink signals in order to receive an ambient radiocommunication signal contained in this frequency band and coming from the environment.

For example, the base station 220 can use the receiving antenna normally used to receive uplink signals.

During a step 2208, the base station 220 determines at least one characteristic of the received ambient signal. For example, a power of the ambient signal is determined.

During a step 2210, the base station 220 searches a disturbance in the frequency band of the uplink signals, using the characteristics of the ambient signals obtained by the base station 220. For example, the power of the ambient signal is compared to a threshold. If this power is greater than the threshold, the presence of a disturbance is detected.

During a step 2212, in the case of detection of a disturbance in the frequency band of the uplink signals, the base station 220 decreases its transmission power at least in the frequency band of the downlink signals.

An example of use of one or more preceding methods for the reduction of interference will now be described.

Initially, at least two PMR infrastructures, each one implemented, for example, by a transportable device like device 100 or device 300, are deployed at a distance from each other.

A user determines the PMR infrastructure with the greatest transmission power and, as a consequence, activates on this PMR infrastructure an interference reduction procedure.

Thus, in operation, the powerful PMR infrastructure implements, at regular or irregular time intervals, at least one of the methods for interference reduction. For example, time intervals equal between 1 ms and 200 ms.

For example, at least one of the methods according to the first and second embodiments disclosed above, is implemented, since they do not need to interrupt communications with the mobile telephones. When a disturbance is detected, at least one of the methods according to the third and fourth embodiments, which require an interruption of their communications, can be implemented in order to confirm the presence of the disturbance.

In the disclosed example, the two PMR infrastructures are deployed at a distance, so that the interference reduction procedure does not detect a disturbance.

Since PMR infrastructures are mobile, they can come close to or move away from each other.

Several topologies are possible on the basis of fixed, mobile and roaming infrastructures. The following disturbances are possible:

Mobile-mobile
Mobile fixed
Mobile roaming
Roaming fixed
Roaming roaming

In addition, these systems can start up/shut down, near each other, move away from each other. All cases are possible and to be taken into consideration in detail, if possible.

The problem is that the stations are not interconnected, permanently turned on and designed a priori and additionally, the infrastructure can be mobile AND start up/shut down depending on operational tasks.

Thus, the procedure for the reduction of interference implemented by the powerful PMR infrastructure detects a disturbance caused by the less powerful PMR infrastructure. This means that the less powerful PMR infrastructure is certainly extremely disturbed by the powerful PMR infrastructure. In consequence, the powerful PMR infrastructure decreases its transmission power, so as to reduce the disturbances it causes to the less powerful PMR infrastructure.

Another advantage of the invention is to be able to use the same Radio and antenna chain as the eNodeb, and if possible, the same digital computing means x86 (or x86 microprocessor(s)) as those implementing the computer code executing the base station.

It is clear that an installation such as the one described above is modular and allows the coverage area to be varied. Additionally, devices not used in the distributed infrastructure are not unnecessary, since they can be used autonomously in other locations where a PMR infrastructure is needed.

It should also be noted that the invention is not limited to the embodiments described above.

Typically, it can be applied to the MCPTT application or to any other possible application (professional or general public) that requires, for example, a user database. Several applications, supported simultaneously, are also possible. MSCTT is an example, but not necessarily PTT or PMR.

The principle also applies to the LTE (HSS and UE) systems part, and optionally, also to the infrastructure part (epc/eNB/PDN/).

The invention also applies to 3G, 4G, 5G infrastructures, and even, if necessary, to an infrastructure like WIFI, or mixed 4G/WiFi, as long as it applies on IP protocol base networks for the application part. Additionally, it is also possible to combine or federate two different architectures, for example, one in wifi and the other in LTE (application base identical to that disclosed, user base in HSS LTE side and AP (access point) Base Wifi side. Since we use the IP protocol, the (Wifi/LTE) type and the IP address are sufficient for the merger of lists in order to navigate. The LTE case applies at the OFDM physical level equivalent to Wimax, WiFi, 4G and even 5G.

The database and table principle also applies to client data and identities (located on the terminals) of locally generated applications. (not only to mobile terminals and their IMSI identities).

PMR is a possible use; in fact, also possible for the General Public, depending on the application used, because the invention could also be applied. Typically, a MEC (Mobile Edge Computing) mode could be applied to the system as it is, with a specific application.

Furthermore, a choice can also be made not to reduce interferences using a certain threshold, in order to retain the coverage of the mobile terminals, but involving a loss of capacity. If we reduce power, one system or both can lose coverage and therefore UEs. The algorithm can then decide that, at the level of acceptable interference, we continue to have significant interferences, even at the risk of losing a great deal of speed because coverage is the primary need. It can therefore have several thresholds, depending on the coverage vs. speed configuration.

It will indeed become evident to the skilled person that various modifications can be made to the embodiment described above, in light of the findings that have just been disclosed to him/her. In the detailed presentation of the invention that is made above, the terms used shall not be interpreted as limiting the invention to the embodiment set out in this description, but shall be interpreted to include all the equivalents whose prediction is within the grasp of the person skilled in the art by applying his/her general knowledge to the implementation of the findings that have just been disclosed to him/her.

What is claimed is:

1. A private mobile radio network installation (500) comprising a plurality of devices each comprising:
   a local private mobile radio network infrastructure comprising
      a core network module,
      a subscriber server connected to the core network module, and
      a base station module connected to the core network module;
   a management system; and
   a network interface;
   wherein the plurality of devices are connected therebetween via their network interfaces;
   wherein the management system of each device of said plurality of devices are configured to:
      choose one of the plurality of devices as a chosen device; and
      connect the base station module of said each device to the core network module of the chosen device of the plurality of devices to form a distributed private mobile radio network infrastructure;
   wherein the management system of each remaining device of said plurality of devices that are not chosen as non-chosen devices is configured to deactivate the core network module and the subscriber server of said each device of said plurality of devices that are not chosen,
      such that the base station module of said each device of said plurality of devices that are not chosen is connected to the core network module via said network interface.

2. The private mobile radio network installation according to claim 1, wherein the distributed private mobile radio network infrastructure is adapted to use, for its operation, operating data stored in the chosen device and comprising
   a list of mobile terminal identifiers authorized to connect to the distributed private mobile radio network infrastructure and,
   for each of these mobile terminals, operating parameters, and
wherein the management system for each device of said plurality of devices are further configured to make a synchronized copy of the operating data on each non-chosen device of said non-chosen devices.

3. The private mobile radio network installation according to claim 2, wherein, following a disconnection of the chosen device, the management system of each device of the plurality of devices still connected therebetween are configured to:
   choose one of the plurality of devices still connected;
   connect the base station module of each always-connected device to the core network module of the chosen device to form a new distributed private mobile radio network infrastructure; and
   provide the new distributed private mobile radio network infrastructure with the synchronized copy of the operating data present on the chosen device so that the new distributed private mobile radio network infrastructure uses said operating data for its operation.

4. The private mobile radio network installation according to claim 2, wherein the mobile terminal identifiers of the mobile terminals include an IMSI, and wherein the operating parameters relating to each mobile terminal may include at least one of: an EMEI, an IP address, and an identifier of a device to which that mobile terminal is connected.

5. The private mobile radio network installation according to claim 1, wherein each of the local private mobile radio network infrastructure of each device of said plurality of devices complies with an LTE standard, so that each core network module is an evolved Packet Core, each subscriber server is a Home Subscriber Server, and each base station module is an evolved NodeB, as defined in that standard.

6. A method for forming a distributed private mobile radio network infrastructure from a plurality of devices, each device of said plurality of devices comprising:
   a local private mobile radio network infrastructure comprising
      a core network module,
      a subscriber server connected to the core network module, and
      a base station module connected to the core network module;
   a management system; and
   a network interface;
   the plurality of devices being connected therebetween by their network interfaces, and the method comprising:
      choosing one of the plurality of devices as a chosen device;
      connecting the base station module of said each device to the core network module of the chosen device of the plurality of devices to form the distributed private mobile radio network infrastructure;
      deactivating the core network module and the subscriber server of said each device of said plurality of devices that are not chosen as non-chosen devices,
         such that the base station module of said each device of said plurality of devices that are not chosen is connected to the core network module via said network interface.

7. The method according to claim 6, further comprising making a synchronized copy on each non-chosen device of said non-chosen devices of operating data of the distributed private mobile radio network infrastructure, recorded in the chosen device and including
   a list of identifiers of mobile terminals authorized to connect to the distributed private mobile radio network infrastructure and,
   for each of the mobile terminals, operating parameters.

8. The method according to claim 7, further comprising, following a disconnection from the chosen device:
   choosing one of the plurality of devices still connected therebetween; and
   connecting the base station module of each device still connected to the core network module of the chosen device to form a new distributed private mobile radio network infrastructure; and
   providing to the new distributed private mobile radio network infrastructure the synchronized copy of the operating data present on the chosen device for the new distributed private mobile radio network infrastructure to use for its operation.

9. The method according to claim 6, wherein each local a local private mobile radio network infrastructure complies with an LTE standard, such that each core network module is an evolved Packet Core, each subscriber server is a Home Subscriber Server, and each base station module is an evolved NodeB, as defined in that standard.

10. A non-transitory processor-executable medium, comprising instructions for performing steps of a method for forming a distributed private mobile radio network infrastructure from a plurality of devices, when said instructions are executed on a computer, each device of said plurality of devices comprising
a local private mobile radio network infrastructure comprising
a core network module,
a subscriber server connected to the core network module, and
a base station module connected to the core network module;
a management system; and
a network interface;
the plurality of devices being connected therebetween by their network interfaces, and
the method comprising
choosing one of the plurality of devices as a chosen device;
connecting the base station module of each device to the core network module of the chosen device of the plurality of devices to form the distributed private mobile radio network infrastructure; and
deactivating the core network module and the subscriber server of said each device of said plurality of devices that are not chosen as non-chosen devices,
such that the base station module of said each device of said plurality of devices that are not chosen is connected to the core network module via said network interface.

* * * * *